(12) United States Patent
Kim et al.

(10) Patent No.: US 10,824,271 B2
(45) Date of Patent: Nov. 3, 2020

(54) DISPLAY DEVICE HAVING TOUCH SENSOR AND DRIVING METHOD THEREOF

(71) Applicant: LG Display Co., Ltd., Seoul (KR)

(72) Inventors: Taeyun Kim, Goyang-si (KR); Deuksu Lee, Goyang-si (KR); Sangkyu Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/791,796

(22) Filed: Oct. 24, 2017

(65) Prior Publication Data

US 2018/0150184 A1 May 31, 2018

(30) Foreign Application Priority Data

Nov. 28, 2016 (KR) .................. 10-2016-0159564

(51) Int. Cl.
*G09G 3/36* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G09G 3/3674* (2013.01); *G09G 3/3685* (2013.01); *G09G 2300/0408* (2013.01); *G09G 2310/08* (2013.01); *G09G 2354/00* (2013.01)

(58) Field of Classification Search
CPC . G06F 3/041; G06F 3/36; G06F 3/044; G06F 3/016; G06F 3/0416
See application file for complete search history.

(56) References Cited

U.S. PATENT DOCUMENTS

| 2014/0210767 | A1* | 7/2014 | Hur | G06F 3/0412 345/174 |
| 2014/0210771 | A1* | 7/2014 | Kim | G06F 3/0412 345/174 |
| 2015/0035777 | A1* | 2/2015 | Hirakata | G06F 1/1652 345/173 |
| 2015/0155871 | A1* | 6/2015 | Shin | H03K 19/0175 327/333 |
| 2015/0227248 | A1* | 8/2015 | Yamazaki | G06F 3/0412 345/173 |
| 2015/0248149 | A1* | 9/2015 | Yamazaki | G06F 1/1635 361/679.27 |
| 2017/0090629 | A1* | 3/2017 | Kim | G06F 3/0418 |
| 2017/0090643 | A1* | 3/2017 | Kim | G06F 3/0412 |
| 2017/0090673 | A1* | 3/2017 | Kim | G06F 3/0418 |

(Continued)

FOREIGN PATENT DOCUMENTS

KR 10-2012-0097762 A 9/2012

OTHER PUBLICATIONS

First Notification of Office Action dated Jun. 17, 2020, issued in corresponding Chinese Patent Application No. 201710993749.4.

*Primary Examiner* — Olga V Merkoulova
(74) *Attorney, Agent, or Firm* — Morgan, Lewis & Bockius LLP

(57) ABSTRACT

Disclosed is a display device having touch sensors and a driving method thereof, and the display device includes an integrated circuit (IC) having a data driver and a touch sensor driver. The display device prevents malfunction of the touch sensor driver by separating at least one of power for the data driver and the touch sensor driver.

17 Claims, 10 Drawing Sheets

(56) References Cited

U.S. PATENT DOCUMENTS

2017/0153734 A1* 6/2017 Kim ..................... G06F 3/044
2017/0154569 A1* 6/2017 Park .................... G09G 3/2096
2018/0075790 A1* 3/2018 Abernathy ............ G09G 3/006
2018/0081473 A1* 3/2018 Seo ..................... H05K 5/0017

* cited by examiner

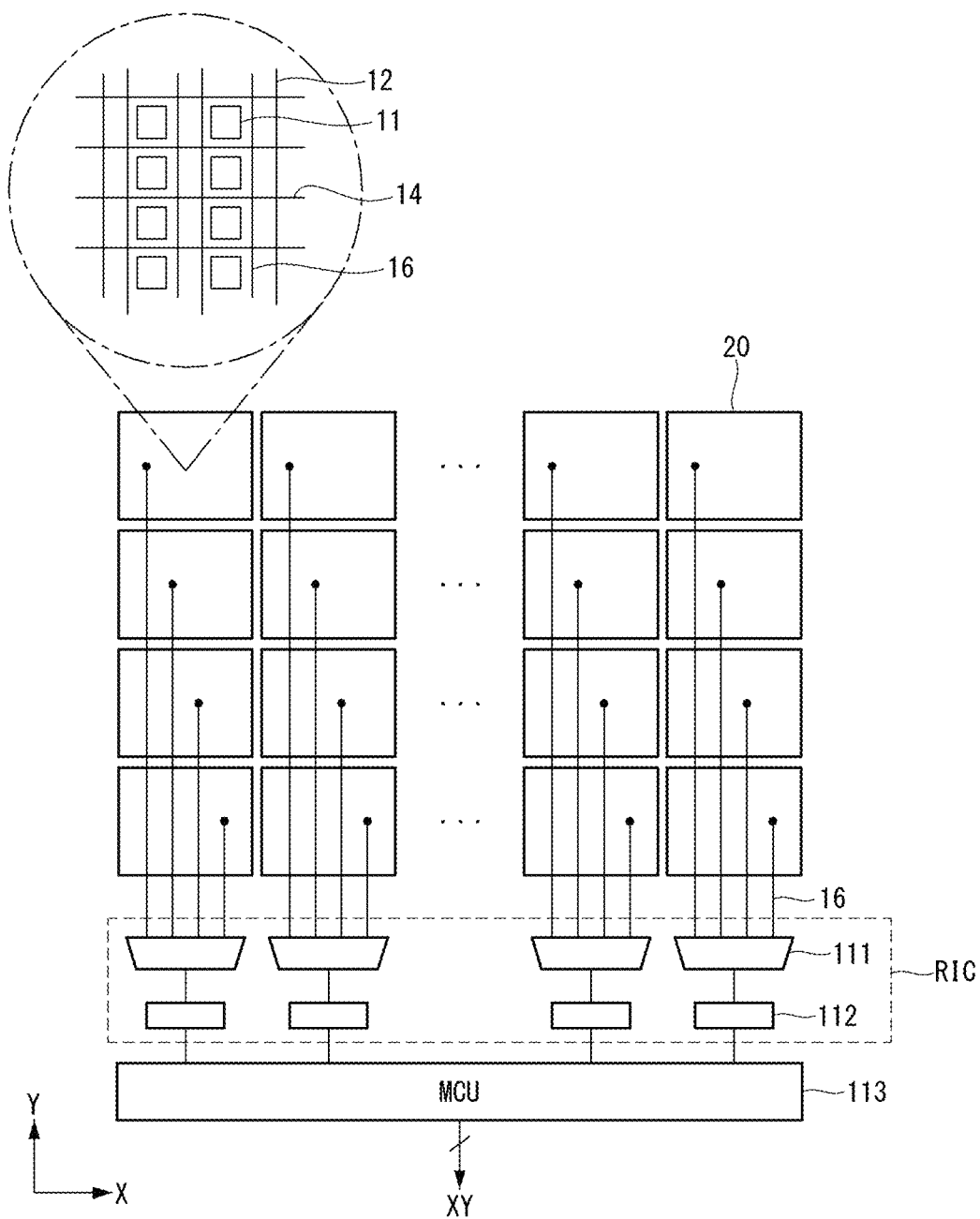

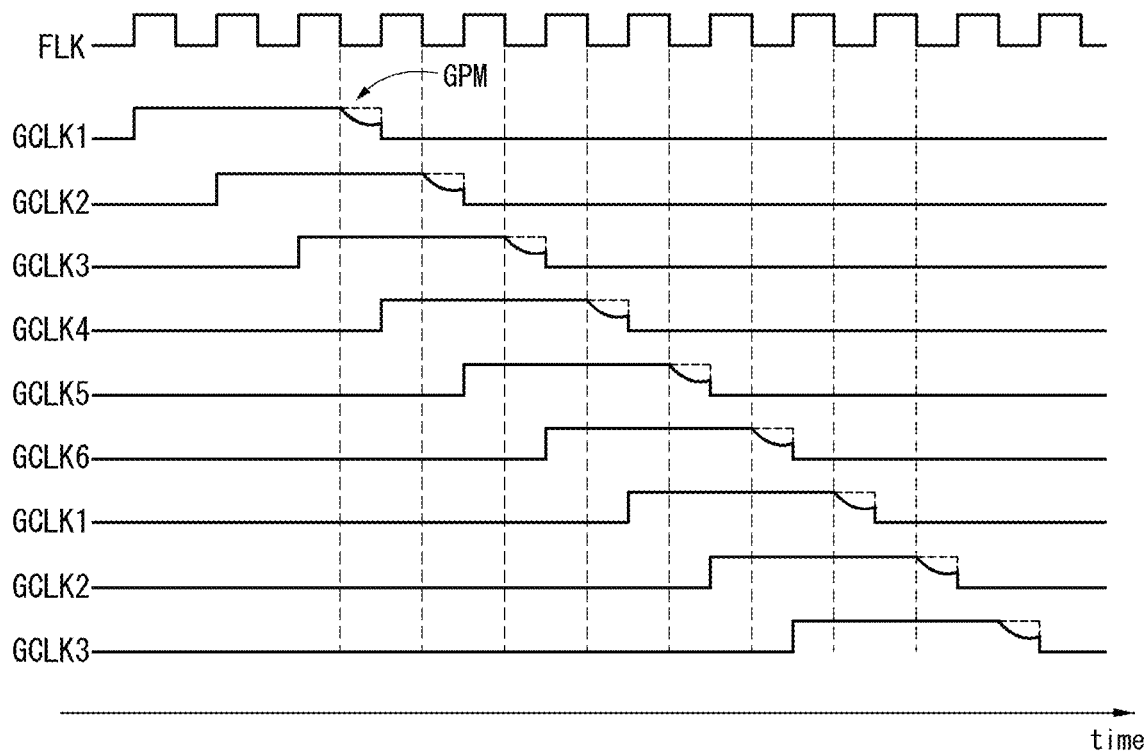
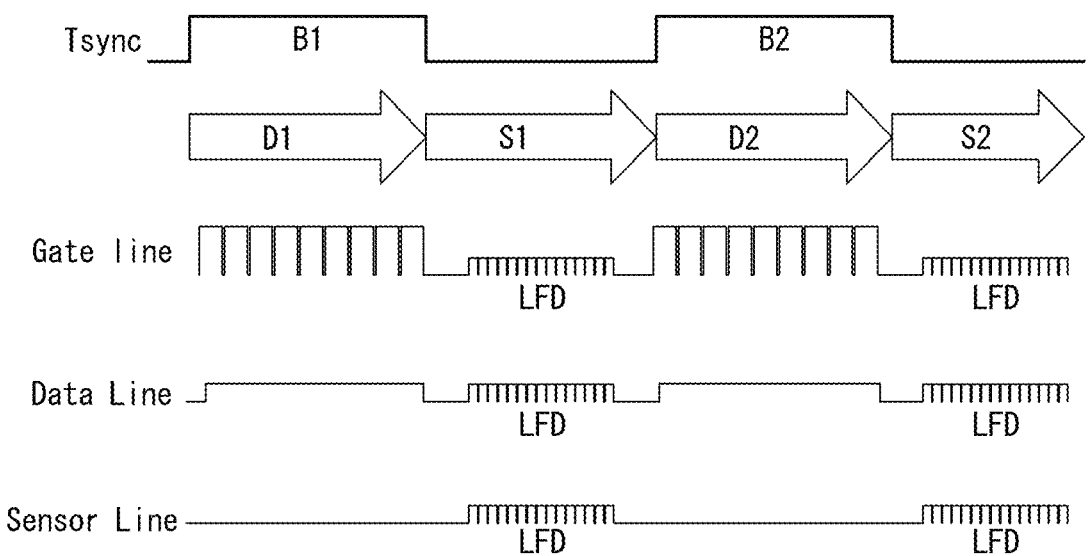

DISPLAY DEVICE HAVING TOUCH SENSOR AND DRIVING METHOD THEREOF

This application claims the benefit of Korean Patent Application No. 10-2016-0159564 filed on Nov. 28, 2016, the entire contents of which is incorporated herein by reference for all purposes as if fully set forth herein.

BACKGROUND

Technical Field

The present invention relates to a display device integrated with an Integrated Circuit (IC), and a driving method thereof, wherein a touch sensor driver for driving a touch sensor and a data driver for outputting data voltage of a pixel are embedded in the IC.

Discussion of the Related Art

A User Interface (UI) enables communication between a human (user) and any electric or electronic device, so that the user is able to control the device easily and conveniently. Examples of the US includes a keypad, a keyboard, a mouse, an On Screen Display (OSD), and a remote controller having an infrared communication or radio frequency (RF) function. UI technologies are still being developed to enhance user sensitivity and to enable easy manipulation. Recently, the UI has evolved into a touch UI, a voice recognition UI, and a three-dimensional (3D) UI.

The touch UI implements a touch screen on a touch panel to sense a touch input, and transmits a user input to an electronic device. The touch UI is now used as an essential element for a mobile information device, such as a smart phone, and applied to a wide range of devices, such as a laptop, a computer monitor, and home appliances.

Implementing a touch screen based on a technique of embedding touch sensors in a pixel array of a display panel is now adapted for various display devices. The touch sensors may be implemented as capacitance-type touch sensors which senses a touch based on a variation of capacitance before and after the touch.

Because the touch sensors are embedded in the pixel array of the display panel, the touch sensors are coupled to pixels through a parasitic capacitance. To reduce interference between the pixels and the touch sensors due to the coupling, an in-cell touch sensor technology divides one frame period into a display period and a touch sensing period, so that an operation time of the pixels and an operation time of the touch sensors are time-divided.

Drivers in a display device having touch sensors includes: a data driver configured to supply a data voltage of an input image to data lines of a display panel during a display period; a gate driver (or a scan driver) configured to supply a gate pulse (or a scan pulse) in sync with the data voltage during the display period; and a touch sensor driver configured to drive the touch sensors during a touch sensing period. Recently, an integrated circuit (hereinafter, referred to as an "SRIC" including a data driver and a touch sensor driver has been developed and used in display devices. However, if the SRIC is used in a display device, touch sensing operation may become unstable.

SUMMARY

Accordingly, embodiments of the present disclosure are directed to a display device having a touch sensor and a driving method thereof that substantially obviate one or more of the problems due to limitations and disadvantages of the related art.

An aspect of the present invention is to provide a display device having touch sensors and a driving method thereof, the display device which is able to prevent malfunction of a touch sensor driver by driving pixels and the touch sensors using an SRIC.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device having touch sensors comprises: a display panel in which data lines and gate lines are intersecting with each other and in which touch sensors are arranged; an Integrated Circuit (IC) which comprises a data driver for supplying a data voltage of an input image to the data lines, and a touch sensor driver for driving the touch sensors. At least one of power for the data driver and power for the touch sensor driver may be separate.

The power separate from the data driver and the touch sensor driver may be applied to the data driver along a first power line and to the touch sensor driver along a second power line, which is separate from the first power line, so that the power is used as power for a digital circuit of the data driver and for an Analog-to-Digital Converter (ADC) of the touch sensor driver.

The display device may further include: a gate driver configured to supply a gate pulse to the gate lines; a gate pulse modulator configured to modulate a voltage of a gate pulse which is to be applied to the gate driver; a timing controller configured to transmit pixel data of the input image to the data driver, and control an operation timing of the data driver and an operation timing of the gate driver; and a touch sensor controller configured to control operation timings of the touch sensors.

One frame period may be time-divided into at least one display period and at least one touch sensing period. The pixels are driven during the display period. The touch sensors are driven during the touch sensing period.

During the display period, the timing controller may generate a control signal for controlling the gate driver, a control signal for controlling the gate pulse modulator, and a control signal for controlling the data driver. During the touch sensing period, the timing controller may stop outputting of at least one of the control signals.

During the touch sensing period, the timing controller may stop outputting of a control signal which is to be applied to the gate pulse modulator.

The gate pulse modulator comprises a touch sensor which modulates the voltage of the gate pulse during only the display period, except for the touch sensing period.

In another aspect, a display device having touch sensors comprises: a display panel in which data lines and gate lines are intersecting with each other and in which touch sensors are arranged; an Integrated Circuit (IC) which comprises a data driver for supplying a data voltage of an input image to the data lines, and a touch sensor driver for driving the touch sensors; a gate driver configured to supply a gate pulse to the gate lines; a gate pulse modulator configured to modulate a voltage of a gate pulse which is to be applied to the gate driver; and a timing controller configured to transmit pixel data of the input image to the data driver, and control an operation timing of the data driver and an operation timing of the gate driver. The power for a digital circuit of the data driver and power for an Analog-Digital Converter (ADC) of the touch sensor driver are separate along additional power paths to be supplied to the data driver and the touch sensor driver, respectively. The timing controller may include a touch sensor which, during a period in which the touch sensors are driven, stops outputting of a control signal which is to be applied to the gate pulse modulator.

In another aspect, a driving method of a display device comprises separating at least one of power for the data driver and power for the touch sensor driver.

In another aspect, a driving method of a display device comprises separating a power supply path for power to be applied to a digital circuit of the data driver, and a power supply path for power to be applied to an Analog-to-Digital Converter (ADC) of the touch sensor driver; and, during a period in which touch sensors are driven, stopping, at the timing controller, outputting of a control signal which is to be applied to the gate pulse modulator.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings:

FIGS. 1 to 3 are diagrams illustrating a display device according to an embodiment of the present invention;

FIG. 4 is a waveform diagram illustrating an example in which a gate pulse is modulated in accordance with a flicker signal;

FIGS. 5 and 6 are waveform diagrams illustrating a driving method of pixels and touch sensors;

DETAILED DESCRIPTION

Figure 1:
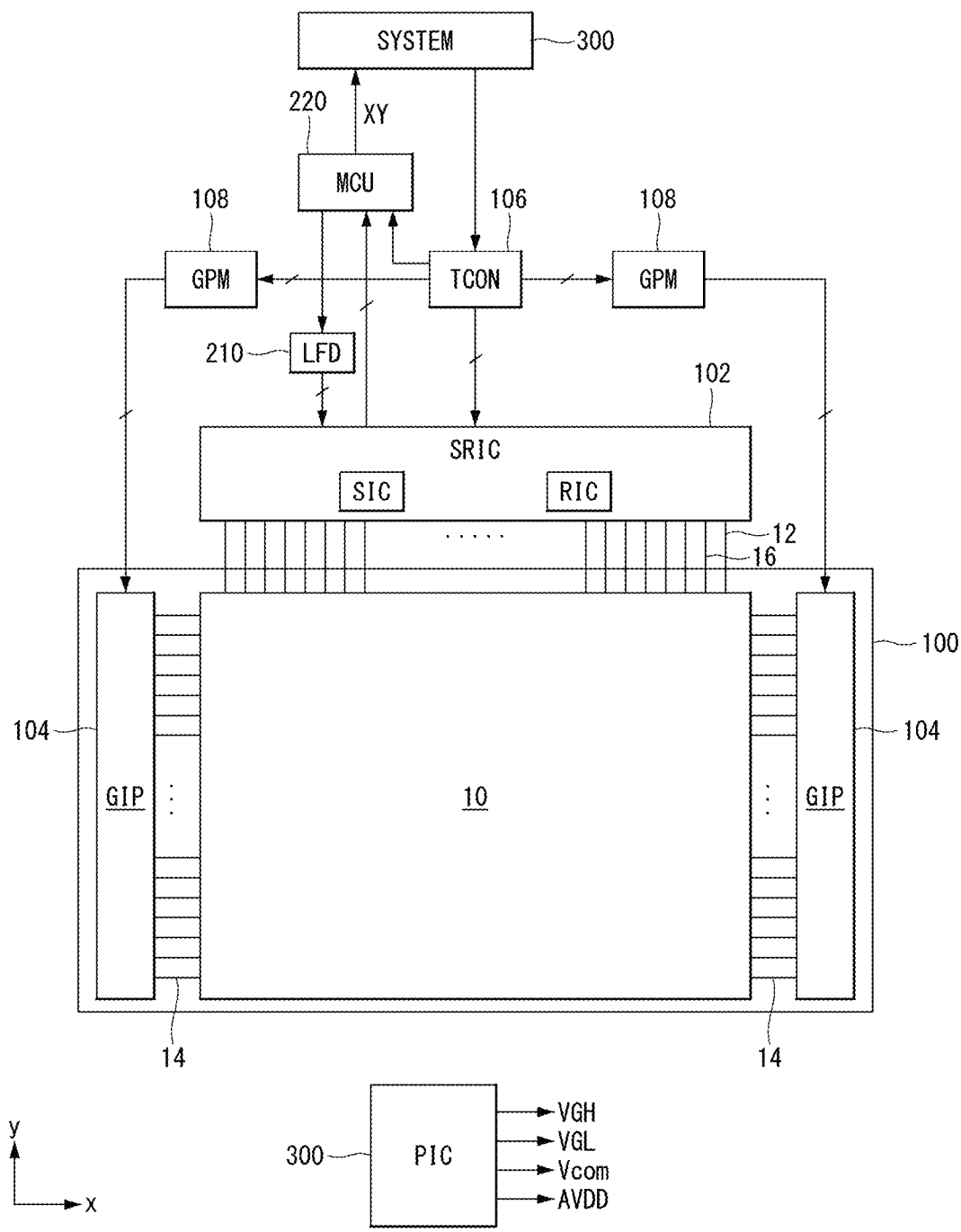

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

The figures, dimensions, ratios, angles, numbers of elements given in the drawings are merely illustrative and thus the present invention is not limited to what is shown in the drawings. Like reference numerals denote like elements throughout the descriptions. Further, in describing the present disclosure, descriptions on well-known technologies may be omitted in order not to obscure the gist of the present disclosure.

It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element Bi" and "an element A next to an element B," another element C may be disposed between the elements A and B unless the term "directly" or "immediately" is explicitly used.

The terms first, second, third and the like in the descriptions and in the claims are used for distinguishing between similar elements and not necessarily for describing a sequential or chronological order. Functions and structures of elements are not restricted by these terms or names of the elements.

Features of various exemplary embodiments of the present disclosure may be combined partially or totally. As will be clearly appreciated by those skilled in the art, technically various interactions and operations are possible. Various exemplary embodiments can be practiced individually or in combination.

A display device of the present invention may be implemented as a flat display device, such as a Liquid Crystal Display (LCD) and an Organic Light Emitting Diode (OLED) display. In the following embodiments, an LCD is mainly described as an example of the flat display device, but aspects of the present invention are not limited thereto. For example, the present invention may be applied to any display device having touch sensors.

The touch sensors may be implemented as on-cell type or add-on type touch sensors arranged on a screen of a display panel. The touch sensors may be implemented as in-cell type touch sensors embedded in the display panel. In the following embodiments, in-cell type touch sensors are mainly described, but touch sensors of the present invention are not limited thereto.

Figure 2:
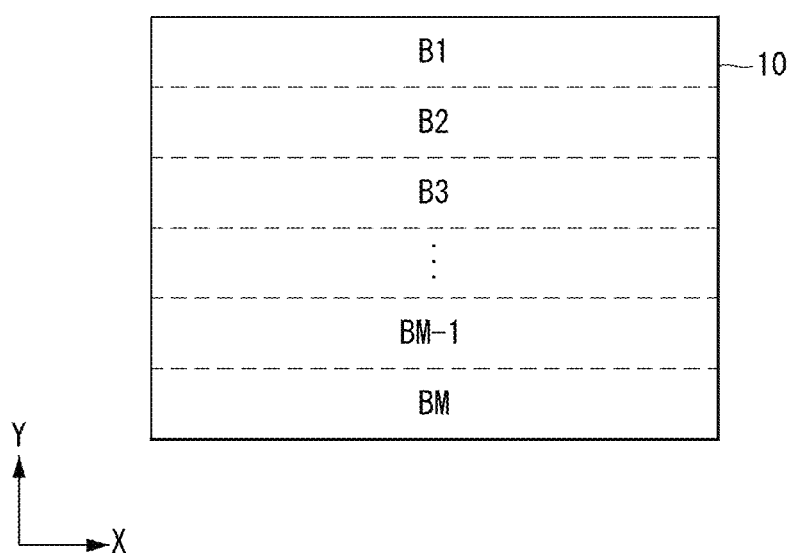

FIGS. 1 to 3 are diagrams illustrating a display device according to an embodiment of the present invention. FIG. 1 is a block diagram schematically illustrating a display device. FIG. 2 is a diagram illustrating a pixel array shown in FIG. 1, which is divided into multiple blocks. FIG. 3 is a diagram specifically illustrating a touch sensor and a touch sensor driver.

Referring to FIGS. 1 to 3, a display device according to an embodiment of the present invention includes a display panel 100, an SRIC 102, a touch sensor controller 220, a parasitic capacitance controller 210, a gate driver 104, a gate pulse modulator 108, and a power circuit 300.

The display panel 100 includes data lines 12, gate lines 14 intersecting with the data lines 12, and a pixel array 10 on which pixels are arranged in matrix defined by the data lines 12 and the gate lines 14. The pixel array 10 implements a screen in which an input image is displayed. The pixel array includes touch sensors 20, and sensor lines 16 respectively connected to the touch sensors 20.

The pixels in the pixel array 10 may include a red (R) subpixel, a green (G) subpixel, and a blue (B) subpixel. Each of the pixels may further include white (W) pixel in addition to the RGB subpixels.

An electrode pattern of each of the touch sensors 20 may be formed as a divided pattern of a common electrode connected to a plurality of pixels 11. The plurality of pixels 11 is connected to one touch sensor 20 to provide a common voltage Vcom to the plurality of pixels 11 in a display period. In addition, the plurality of pixels 11 is driven by the touch sensor driver RIC in a touch sensing period to sense a touch input.

One frame period of the display panel 100 is time divided into at least one display period and at least one touch sensing period to drive the touch sensors 20 and the pixels 11 embedded in the pixel array. The pixel array of the display panel 100 is time-division driven with two or more blocks B1 to BM, as shown in FIG. 2. The pixel array of the display panel 100 may be driven in a time-division manner based on two or more blocks B1 to BM, as illustrated in FIG. 2. The pixel array of the display panel 100 is driven in display periods each between two touch sensing period in which the touch sensors 20 are driven.

It is not necessary to divide the blocks B1 to BM on the screen physically. The blocks B1 to BM are driven in between a touch sensing period in a time-division manner. For example, pixels in a first block BQ are driven in a first display period to write data of the current frame into the pixels 11, and then a touch input is sensed from the entire screen in a first touch sensing period. In a second display period following the first touch sensing period, pixels 11 in a second block B2 are driven to write data of the current frame into the pixels 11. Then, a touch input is sensed from the entire screen in the second touch sensing period. The touch input includes a direct touch input of a finger or a stylus pen, an proximity touch input, a fingerprint touch input, etc.

The driving method of a touch sensor may make a touch report rate faster than a frame rate of the screen. The frame rate is a frequency for updating data of a frame on the screen. According to the National Television Standard Committee, a frame rate is 60 Hz. According to the Phase-Alternating line, a frame rate is 50 Hz.

The touch report rate is a frequency for generating coordinates of a touch input over the entire screen. The present invention may divide the screen into preset block units and drive touch sensors between display periods to generate coordinates of a touch input, so that a touch report rate is twice faster than a frame rate of the screen to thereby increase touch sensitivity.

The pixel array 10 of the display panel 100 may be divided into a Thin Film Transistor (TFT) array and a color filter array. The TFT array may be formed on the top surface or the bottom surface of the display panel 100. The TFT array may include TFTs formed at intersections between the data lines 12 and the gate lines 14, a pixel electrode for charging a data voltage, a storage capacitor Cst connected to the pixel electrode to maintain the data voltage, etc., and displays an input image. The TFT array includes sensor lines 16, and electrodes of touch sensors 20 connected to the sensor lines 16.

The color filter array may be formed on the top surface or the bottom surface of the display panel 100. The color filter array may include a black matrix, a color filter, etc. In the case of a Color Filter on TFT (COT) or a TFT on Color Filter (TOC), a color filter or black matrix may be disposed on the same substrate together with the TFT array.

The touch sensors 20 may be implemented as a capacitance touch sensor, for example, a mutual capacitance sensor or a self-capacitance sensor. Self capacitance is formed along a conductive line on a monolayer formed in one direction. The self capacitance is formed between two conductor lines orthogonal to each other. FIG. 3 illustrates self capacitance-type touch sensors, but touch sensors of the present invention are not limited thereto.

The touch sensors 20 may be implemented as electrodes divided from the common electrode of the pixels 11. The touch sensors 20 may be connected to the SRIC 102 through the sensor lines 16.

The SRIC 102 includes a data driver SIC and a touch sensor driver RIC. The data driver supplies a data voltage of an input image to the data lines 12 during a display period. The touch sensor driver RIC is connected to the touch sensors 20 through the sensor lines 16 to drive the touch sensors 20 during a touch sensing period.

During a display period, a digital circuit of the data driver SIC receives pixel data (digital data) of an input image from a timing controller TCON 105, latches the pixel data, and provides the latched pixel data to a Digital-to-Analog Converter (DAC). The DAC converts the pixel data into a gamma compensation voltage to generate a data voltage. The data voltage output from the SIC is supplied to the data lines 12. A multiplexer not shown in the drawings may be disposed between the data driver SIC and the data lines 12. Under the control of the timing controller 106, the multiplexer distributes a data voltage, received from the data driver SIC, to the data lines 12. In the case where a 1:3 multiplexer is implemented, the multiplexer time-divides a data voltage, which is received through a single output channel of the data driver SIC, and supplies the time-divided data voltage to two data lines in a time-division manner. When the 1:3 multiplexer is used, the number of channels of the data driver SIC may be reduced to ⅓.

In a touch sensing period, the touch sensor driver RIC of the SRIC 102 drives the touch sensors by supplying electric charges to the touch sensors 20 in accordance with a sensor driving signal PWM_TX received from the touch sensor controller 220. In the touch sensing period, the touch sensor driver RIC may output touch raw data indicative of a variation of capacitance before and after a touch input to the touch sensors 20.

The touch sensor driver RIC includes a multiplexer 111 and a sensing circuit 112, as illustrated in FIG. 3. Under the control of the touch sensor controller 220, the multiplexer 111 selects sensor lines 16 which are to be connected to the sensing circuit 112. Under the control of the touch sensor controller 220, the multiplexer 111 may supply a common voltage Vcom in a display period. The respective multiplexers 111 may sequentially connect the sensor lines 16 to channels of the sensing circuit 112, thereby possibly reducing the number of channels of the sensing circuit 112.

Figure 8:
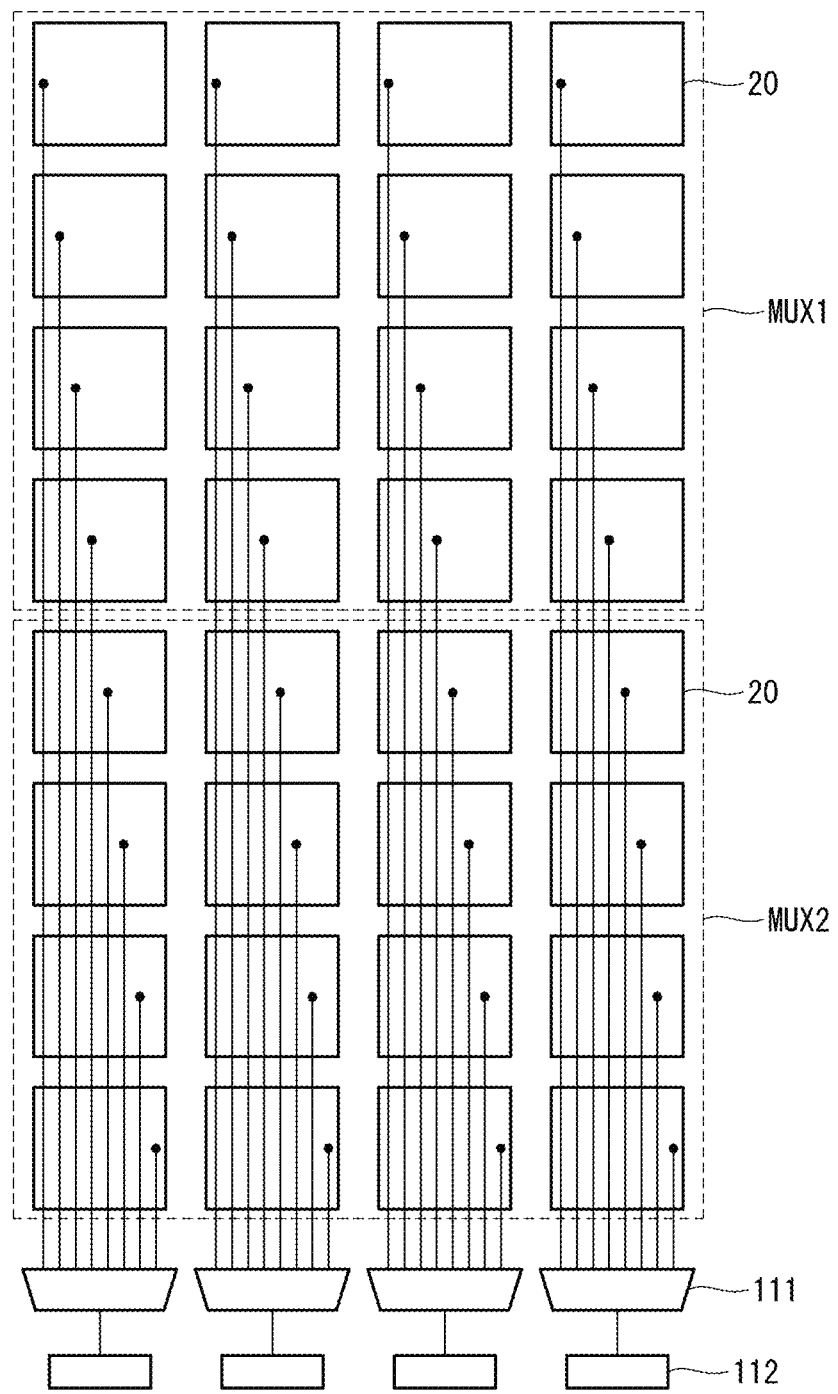
FIG. 8 is a diagram illustrating an example of a MUX block in touch sensors.

The sensing circuit 112 charges electric charges to the touch sensors 20 by supplying a load-free driving signal LFD, received from the parasitic capacitance controller 210 through the multiplexer 111 and the sensor lines 16, to the touch sensors. In this manner, the sensing circuit 112 amplifies and integrates a quantity of electric charges of the touch sensors 20 received from the sensor lines connected through the multiplexer 111, converts the quantity of electric charges into digital data, and senses a variation of capacitance before and after a touch input. To this end, the sensing circuit 112 includes: an amplifier for amplifying touch sensor signals received from the touch sensors 20; an integrator for accumulating an output voltage of the amplifier; and an Analog-to-Digital Converter (ADC) for converting a voltage of the integrator into digital data. The digital data output from the ADC is transmitted to the touch sensor controller 220 as touch data which indicates a variation of capacitance of the touch sensors 20 before and after the touch input. Under the control of the touch sensor controller 220, the respective sensing circuits 112 may sequentially drive the touch sensors 20 on the basis of MUX block unit (MUX1 and MUX2), as illustrated in FIG. 8.

By comparing touch data received from the touch sensor driver RIC with a preset threshold value, the touch sensor controller 220 may detect a touch data having a value greater than the threshold value and generate coordinates of each touch input. The touch sensor controller 220 transmits coordinates XY of each touch input to a host system not shown in the drawings. The touch sensor controller 220 controls an operation timing of the touch sensor driver RIC by outputting a sensor driving signal PWM_TX, a n ADC clock, etc. The touch sensor controller 220 may be implemented as a Micro Control Unit (MCU), but aspects of the present invention are not limited thereto.

Figure 6:
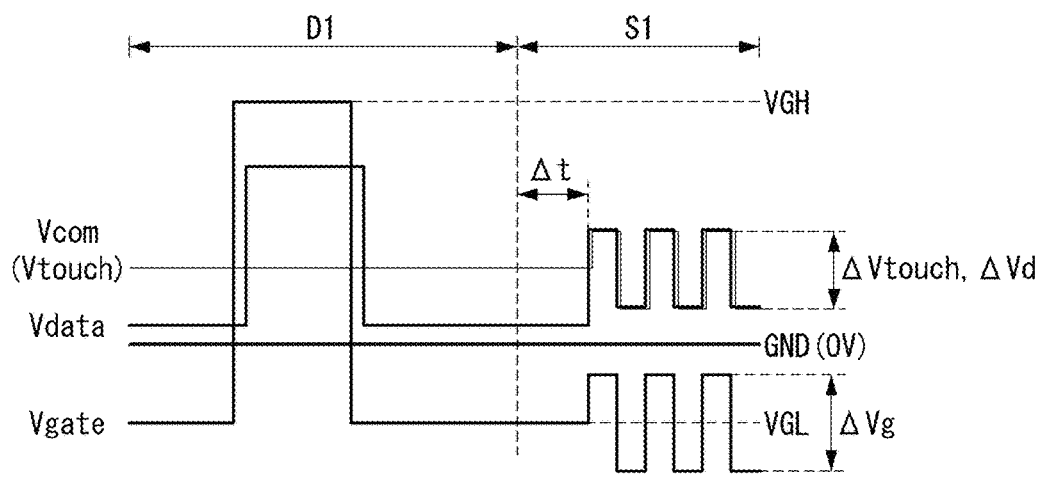

The parasitic capacitance controller 210 minimizes parasitic capacitance between the touch sensors and pixels during a touch sensing period to improve a Signal to Noise Ratio (SNR) of a touch sensor signal. To this end, in response to a sensor driving signal PWM_TX from the touch sensor controller 220, the parasitic capacitance controller 210 generates a load free driving signal (LFD). As illustrated in FIGS. 5 and 6, the load free driving signal LFD is applied to the data lines 12, the gate lines 14, and the sensor lines 16. The load free driving signal LFD applied to the sensor lines 16 charges electric charges of the touch sensors 20, and minimizes a parasitic capacitance between neighboring sensor lines 16.

The gate driver 104 may include a shift register which outputs a gate pulse in response to a gate timing control signal from the gate pulse modulator 108. The gate timing control signal from the gate pulse modulator 108 may include a start pulse, a shift clock, etc. By shifting a gate pulse at a shift clock timing, the shift register supplies a gate pulse to the gate lines 14 sequentially. The shift register may be formed directly on the substrate of the display panel 100 along with the TFT array of the pixel array in the same process. In FIG. 1, "GIP (Gate In Panel)" indicates a shift register mounted directly on the substrate of the display panel 100.

The gate pulse modulator 108 receives a gate timing signal of a digital signal level from the timing controller 106. The gate timing signal generated by the timing controller 106 includes a start pulse, a shift clock, a flicker signal FLK, etc. The gate pulse modulator 108 shifts a voltage of the start pulse and a voltage of the shift clock to a gate high voltage (VGH) and a gate low voltage (VGL). In addition, as illustrated in FIG. 4, in response to the flicker signal FLK, the gate pulse modulator 108 reduces the VGH to modulate a VGH of gate shift clocks GCLK1 to GCLK6.

Because the gate driver 104 charges the gate lines 14 to the voltage of the shift clocks GCLK1 to GCLK6, a gate pulse is modulated into a waveform like a waveform of the shift clocks GCLK1 to GCLK6. In FIG. 1, "GPM (Gate Pulse Modulation)" denotes the gate pulse modulator 108.

A method of modulating a gate pulse may improve a flicker based on the following principle.

A voltage changed in liquid crystals are affected by a kickback voltage ΔVp (or a feed through voltage ΔVp) which occurs due to a parasitic capacitance of a TFT and which is defined as in the following equation. When a data voltage is applied to a pixel, the data voltage is changed as much as the kickback voltage ΔVp. Thus, brightness is changed as much as the kickback voltage ΔVp, and thus, flicker comes to appear.

$$\Delta Vp = \frac{Cgs}{Clc + Cst + Cgs}(VGH - VGL)$$

Here, "Clc" denotes a capacitance of liquid crystals of a pixel, "Cst" denotes a storage capacitor Cst of a storage capacitor (Cst) pixel, and "Cgs" denotes a parasitic capacitance formed between a gate of a TFT connected to the gate line 14 and a source of a TFT connected to the pixel electrode 11. VGH-VGL denotes a voltage of a gate pulse applied to the gate line 14.

If VGH is reduced from the falling edge of the gate pulse, it is possible to reduce VGH-VGL in the above equation and accordingly reduce ΔVp, so that flicker may improve.

Using a DC-DC converter, the power circuit 300 generates DC power necessary to drive the display panel 100. The DC-DC converter includes a charge pump, a regulator, a buck converter, a boost convert, etc. The power circuit 300 may be implemented as a Power Integrated Circuit (PIC). The power circuit 300 may output power, such as AVDD, VGH, VGL, and Vcom, which is necessary to drive pixels and touch sensors of the display panel 100. AVDD (1.8V) is used as power for a data receiving circuit and a digital circuit of the data driver SIC, and as analog power for the touch sensor driver RIC. In the touch sensor driver RIC, AVDD is used as a bias of the ADC and reference block power.

The timing controller 106 transmits pixel data of an input image, received from a host system not shown in the drawings, to the data driver RIC of the SRIC 102. The timing controller 106 receives a timing signal which is synchronized with the pixel data, the timing signal which includes a vertical synchronization signal Vsync, a horizontal synchronization signal Hsync, a data enable signal DE, and a main clock MCLK. In response to the timing signal, the timing controller 106 generates a timing control signal for controlling an operation timing of the data driver SIC, and a gate timing control signal for controlling an operation timing of the gate driver 104.

Based on the vertical synchronization signal Vsync, the timing controller 106 generates a synchronization signal Tsync for synchronizing the SRIC 102 and the gate driver 104. A high level of the synchronization signal Tsync may define a display period, and a low level of the synchronization signal Tsync may define a touch sensing period; however, aspects of the present invention are not limited thereto. The synchronization signal Tsync is supplied to the touch sensor controller 220. As described above, the gate timing control signal includes a start pulse, a shift clock, a flicker signal, etc.

The host system may be any one of a television system, a set-top box, a navigation system, a personal computer (PC), a home theater system, a mobile system, and a wearable system. The host system converts digital video data of an input image into data in a format suitable for displaying the digital video data on the display panel 100. The host system transmits timing signals Vsync, Hsync, De, and MCLK to the timing controller 106, along with the digital video data of the input image. The host system executes an application program associated with coordinate information of a touch input received from the touch sensor controller 220.

FIGS. 5 and 6 are waveform diagrams illustrating how to drive pixels and touch sensors.

Referring to FIGS. 5 and 6, one frame period may be time-divided into a display period D1 or D2 and a touch sensing period S1 or S2. When a display frame rate is 60 Hz, one frame period is approximately 16.7 ms. One touch sensing period S1 or S2 is allocated between display periods D1 and D2.

The data driver SIC and the gate driver 104 of the SRIC 102 writes the current frame data into pixels of a first block B1 during a first display period D1 so as to update an image, represented in the first block, with the current frame data. During the first display period D1, pixels of other block B2 except for the first block B1 maintains the previous frame data. During the first display period D1, the touch sensor driver RIC supplies the touch sensors 20 with a common voltage Vcom which is a reference voltage of pixels.

During a first touch sensing period S1, the touch sensor driver RIC of the SRIC 102 may sequentially drive all of the touch sensors 20 in the screen on the basis of MUX block unit (MUX1 and MUX2) so as to sense a touch input. Touch data output from the touch sensor driver RIC may be transmitted to the touch sensor controller 220 through a Serial Peripheral Interface (SPI). The touch sensor controller 220 analyzes the touch data, generates touch report data including coordinate information and identifier information (ID) of each touch input, and transmits the touch report data to the host system.

During a second display period D2, the data driver SIC and the gate driver 104 of the SRIC 102 writes the current frame data into pixels of the second block B2 so as to update image, represented in the second block B2, with the current frame data. During the second display period D2, pixels in other block B1 except for the second block B2 maintains the previous frame data. During the second display period D2, the touch sensor driver RIC supplies the touch sensors 20 with a common voltage Vcom which is the common voltage of the pixels.

During a second touch sensing period S2, the touch sensor driver RIC of the SRIC 102 sequentially drives all of the touch sensors 20 in the screen on the basis of MUX block unit (MUX1 and MUX3) so as to sense a touch input. Touch data output from the touch sensor driver RIC may be transmitted to the touch sensor controller 220 through the SPI. The touch sensor controller 220 analyzes the touch data, generates touch report data including coordinate information and identifier information (ID) of each touch input, and transmits the touch report data to the host system.

Since the touch sensors 20 are connected to the pixels 11, there is a large parasitic capacitance between the touch sensors 20 and the pixels 11. Such a parasitic capacitance causes reduction in the SNR of a touch sensor signal.

During a display period, pixel driving signals Vcom, Vdata, and Vgate are supplied to pixels. Vcom is a common voltage supplied to a touch sensor electrode, that is, a common electrode, along the sensor line 16 during the display period. Vdata is a data voltage of an input image supplied to the data lines 12 during the display period. Vgate is a voltage of a gate pulse supplied to the gate lines 14 during the display period. During a touch sensing period, a load free driving signal LFD is applied to the data line 12, the gate lines 14, and the sensor line 16, as illustrated in FIG. 6. The load free driving signal LFDdrives the touch sensors 20, and minimizes the parasitic capacitance between the pixels and the touch sensors 20.

During a touch sensing periods S1 or S2, the SRIC 102 supplies a load free driving signal LFD from the parasitic capacitance controller 210 to the data lines 12 and the sensor lines 16. During a touch sensing period S1 or S2, the gate driver 104 supplies a load free driving signal LFD from the parasitic capacitance controller 210 to the gate liens 14.

A voltage Vtouch of the load free driving signal LFD applied to the sensor line 16 is the same as a driving voltage of the touch sensor 20. In FIG. 6, $\Delta Vtouch=\Delta Vd=\Delta Vg$. $\Delta Vd$ denotes a voltage of a load free driving signal LFD applied to the data liens 12, $\Delta Vg$ is a voltage of a load free driving signal LFD applied to the gate lines 12. Thus, during the touch sensing period S1 or S2, there is no voltage difference in both ends of a parasitic capacitance between the data lines 12 and the touch sensor 20, between the gate line 14, and the touch sensor 20, and between the sensor lines 16, and therefore, the parasitic capacitance may be minimized.

When a display period D1 or D2 transitions to a touch sensing period S1 or S2, a time $\Delta td$ may be taken until a waveform and a voltage of the load free driving signal LFD is stabilized. Depending on a parasitic capacitance of the display panel 100 and a driving voltage Vtouch of the touch sensor, the time $\Delta td$ may be adjusted.

Figure 7:
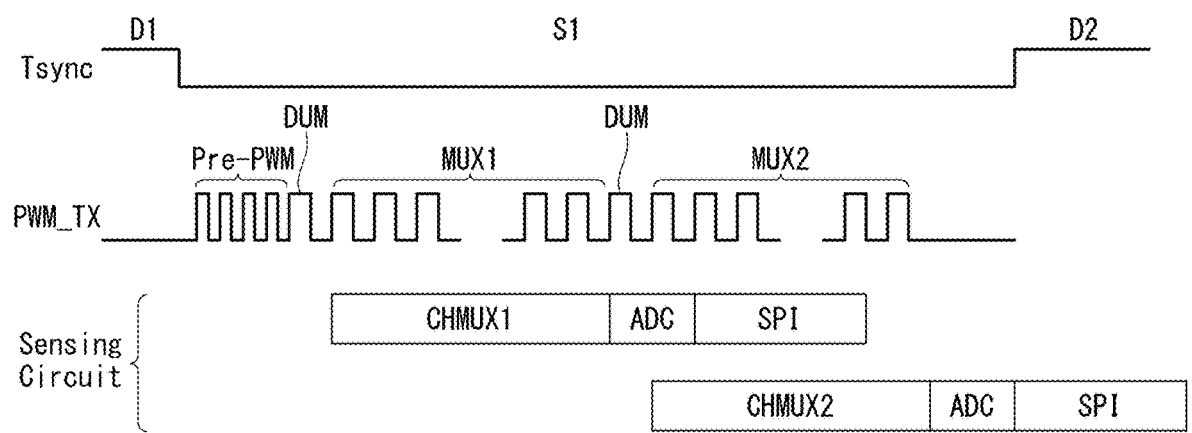
FIG. 7 is a waveform diagram specifically illustrating a sensor driving signal during a touch sensing period.

FIG. 7 is a waveform diagram illustrating details of a sensor driving signal PWM_TX during a touch sensing period. FIG. 8 is a diagram illustrating an example of a MUX block, such as MUX1 and MUX2, in touch sensors.

Referring to FIGS. 7 and 8, the touch sensor controller 220 generates a sensor driving signal PWM_TX during a touch sensing period S1. The sensor driving signal PWM_TX includes a pre-PWM signal Pre-PWM, a dummy signal DUM, and a channel activation signal MUX1 and MUX2.

Immediately after an operation mode transitions from a display period D1 to a touch sensing period S1, pixel driving signals Vcom, Vdata, and Vgate are changed into a load free driving signal LFD. At the beginning of the touch sensing period S1, a time $\Delta td$ is taken until a waveform and a voltage of the load free driving signal LFD is stabilized. During the time $\Delta td$, the pre-PWM signal Pre-PWM is generated.

The touch sensor driver RIC of the SRIC 102 does not connect the sensor lines to channels of the sensing circuit 112 during periods of the pre-PWM signal Pre-PWM and the dummy signal DUM. Instead, the touch sensor driver RIC of the SRIC 102 connects the sensor lines 16 to the channels of the sensing circuit 112 during following channel activation signal periods CHMUX1 and CHMUX2. During a first channel activation signal period CHMUX1, the sensing circuit 112 converts a signal from touch sensors 20 in the first MUX block MUX1 into digital data, that is, touch data, by using an ADC, and transmits the digital data to the touch sensor controller 220. During a second channel activation period CHMUX2, the sensing circuit 112 converts a signal from touch sensors in the second MUX block MUX2 into digital data by using the ADC, and transmits the digital data to the touch sensor controller 220 through an SPI. During the second channel activation period CHMUX2, it is possible to transmit ADC output data obtained from the touch sensors 20 in the first MUX block MUX1, and, at the same time, to receive, amplify, and integrate signals from the touch sensors 20 in the second MUX block MUX2. The dummy signal DUM may be generated between the first channel activation period CHMUX1 and the second channel activation period CHMUX2.

Figure 9:
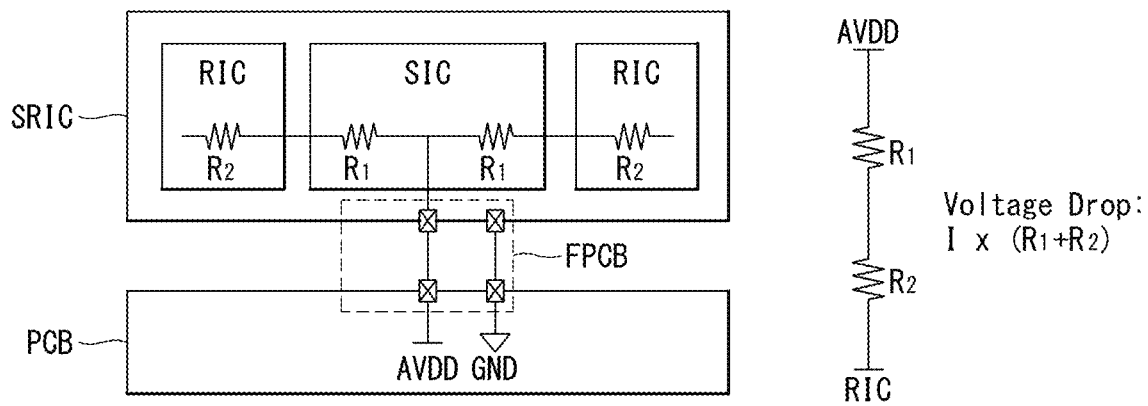
FIG. 9 is a diagram schematically illustrating a structure in which a data driver and a gate driver of an SRIC shares power.

As illustrated in FIG. 9, the SIRC 102 may be designed to allow the data driver SIC and the touch sensor driver RIC to share power. In FIG. 9, "FPCB" denotes a flexible printed circuit board, and "PCB" denotes a printed circuit board.

As illustrated in FIG. 9, if the data driver SIC and the touch sensor driver ROC shares AVDD, there may be a considerable amount of voltage drop in the voltage AVDD applied to the touch sensor driver RIC, which possibly leads to malfunction of the touch sensor driver RIC. The AVDD, which has dropped as much as a sum of the resistance R1 of the data driver SIC and the resistance of a power line R2 connected in serial to the resistance R1, is applied to the touch sensor driver RIC. Accordingly, the touch sensor driver RIC may malfunction as below.

According to an experiment result, if an ADC operation period overlaps a display period, pixels are connected to the data driver SIC and this may increase the resistance R1 of the data driver SIC. This may lead to a considerable amount of IR voltage drop in the AVDD supplied to the touch sensor driver RIC, and cause recognition of ghost touch which indicates occurrence of touch input occurrence in a touch sensor where any touch is not input. This problem may occur not just in a driving method of in-cell touch sensors which are driven based on a display period and a touch sensing period, but also when pixels and touch sensors are driven at the same time.

Figure 10:
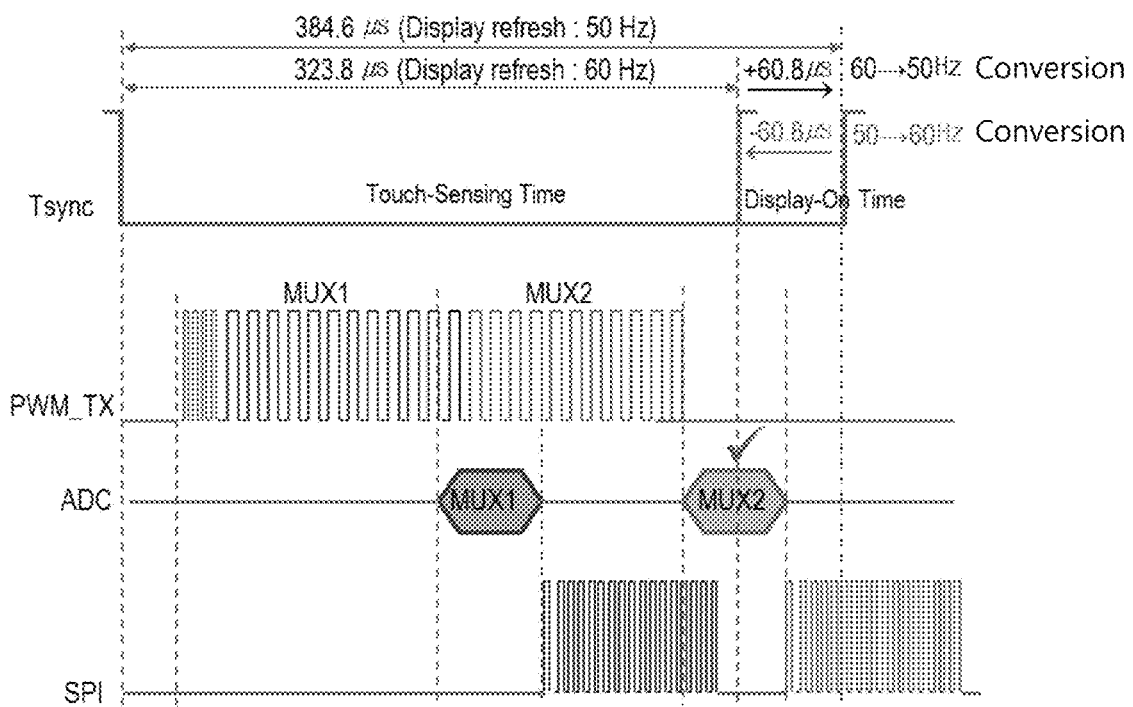
FIG. 10 is a diagram illustrating an ADC error which occurs when a frame rate is changed in a system using an SRIC in which a data driver and a gate driver shares power.
Figure 11:
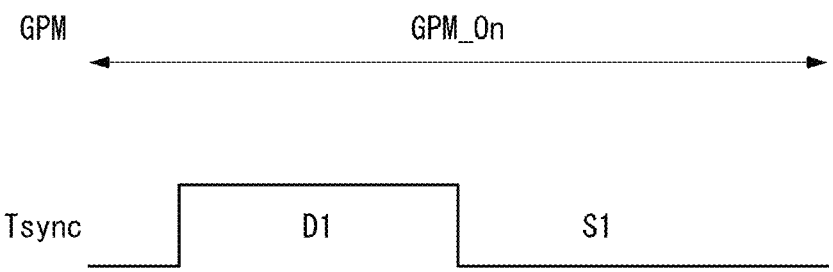
FIG. 11 is a diagram illustrating an example in which modulation of a gate pulse is activated during a display period and a touch sensing period.

FIG. 10 shows an example in which an ADC output error occurs because an ADC operation relating to signals from the touch sensors 20 in the second MUX block overlaps with a display period for driving pixels in the case of implementing a Seamless Display Refresh Rate Switching (SDRRS) function which is for reducing a display refresh rate or a frame rate upon switching to a power saving mode. Suppose a laptop system that operates at a display refresh rate of 60 Hz with an AC adapter connected, and operates at a display refresh rate of 50 Hz in a DC battery state, in which the AC adapter is not connected, in order to reduce power consumption. In this case, if the power state is changed from the DC battery state (50 Hz) to the AC adapter connected state (60 Hz), an ADC time of a touch sensor signal may overlap the display period and therefore a ghost touch input may be recognized.

Figure 12:
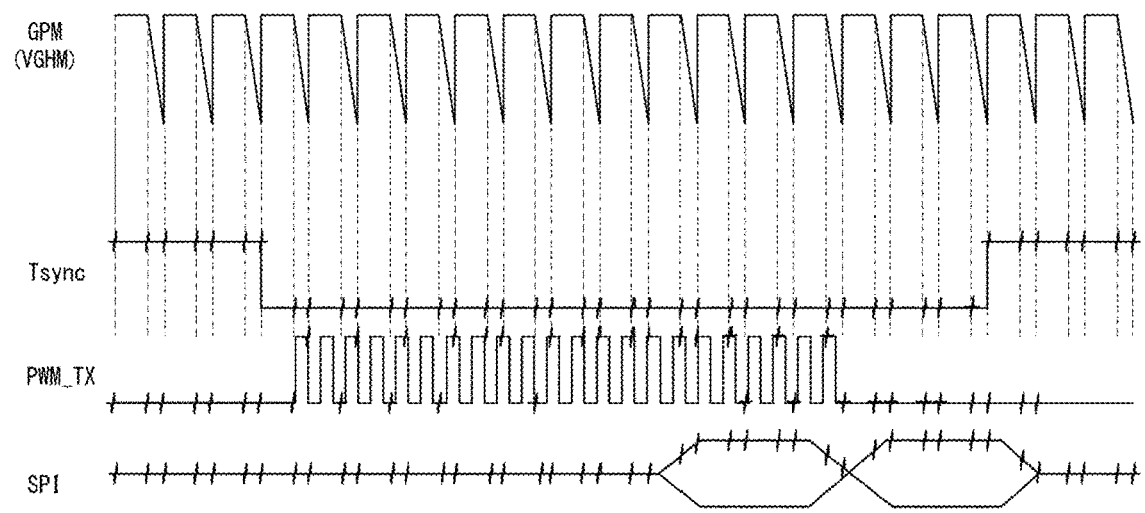
FIGS. 12 and 13 are diagrams illustrating noise of a sensor driving signal and jitter of touch data, which occur due to gate pulse modulation during a touch sensing period.
Figure 13:
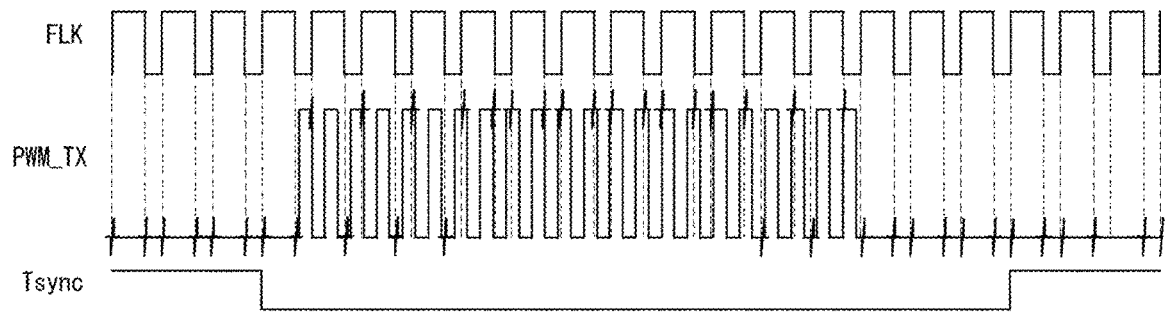

As found in the experimental results in FIGS. 12 and 13, if the gate pulse modulator 108 operates in a touch sensing period, a touch sensing error may occur. FIGS. 12 and 13 show noise of a sensor driving signal PWM_TX and jitter of touch data, which occur due to gate pulse modulation GPM during the touch sensing period. In FIG. 12, "GPM (VGHM)" indicates a voltage in which VGH is modulated by the gate pulse modulator 108 in accordance with a flicker signal FLK. In FIG. 12, 0.7V indicates noise of the sensor driving signal PWM_TX which occurs at a reverse timing of the flicker signal FLK. In FIG. 13, noise is applied to a sensor driving signal PWM_TX at a rising/falling edge of the flicker signal FLK and therefore jitter occurs in touch data.

Figure 14:
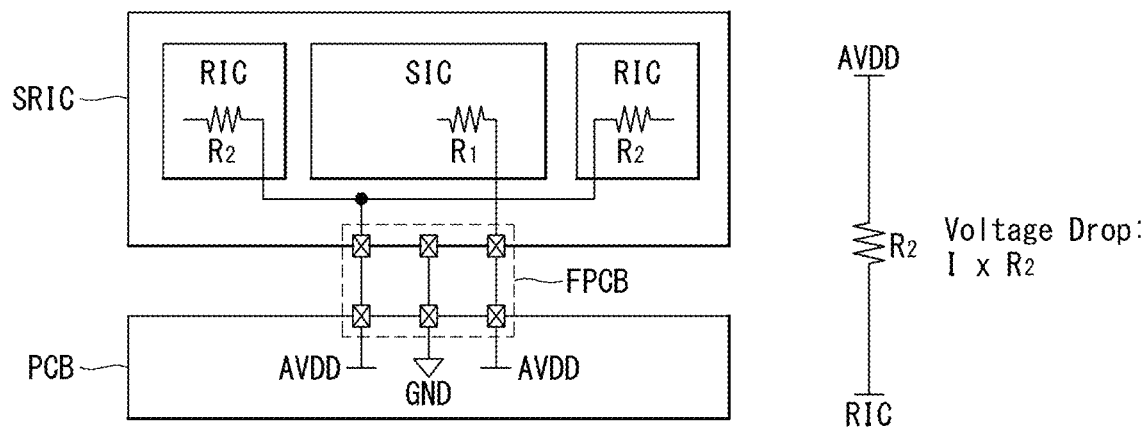
FIG. 14 is a diagram illustrating an example in which power for a data driver of an SRIC and a power supply for a gate driver is separated.

To prevent malfunction of the SRIC 102, the present invention separates at least one of power for a data drivers SIC and a touch sensor driver RIC, as illustrated in FIG. 14. In particular, AVDD having a separate power supply path, as shown in FIG. 14, may be supplied independently to the data drivers SIC and the touch sensor driver RIC. AVDD may be used as power for a digital circuit of the data drivers SIC and for the ADC of the touch sensor driver RIC.

Referring to FIG. 14, the AVDD is applied to the touch sensor driver RIC along a first power line of the SRIC 102. In addition, the AVDD is applied to the data drivers SIC along a second power line of the SRIC 102. The first power line and the second power line are separate. The touch sensor drivers RIC may be separate with the data driver SIC therebetween, but aspects of the present invention are not limited thereto. The first and second power lines may be separate on a PCB and a FPCB, as illustrated in FIG. 14.

Figure 15:
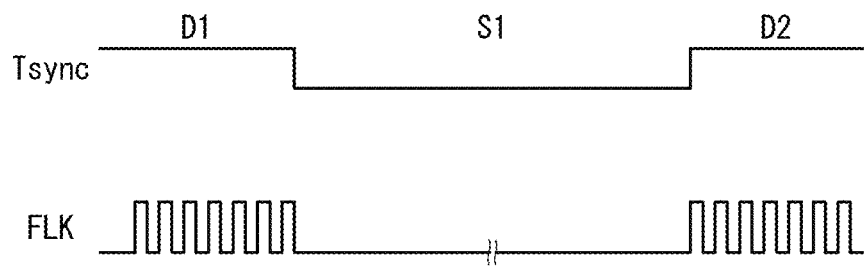
FIG. 15 is a waveform diagram illustrating an example in which a flicker signal for gate pulse modulation is not generated during a touch sensing period.

The present invention may prevent malfunction of a touch sensor driver by stopping outputting of at least one control signal for driving pixels during a touch sensing period. During a display period a timing controller drives pixels by generating a control signal for controlling a gate driver, a control signal for controlling a gate pulse modulator, and a control signal for controlling a data driver. During a touch sensing period, the timing controller stops outputting of at least one of the control signals. In particular, as illustrated in FIG. 15, the timing controller 106 may stop outputting of a flicker signal FLK which is to be input to the gate pulse modulator 108. As a result, a gate high voltage of a gate pulse is modulated during a display period (see a full line in FIG. 4), whereas a gate high voltage of a gate pulse is not modulated during a touch sensing period (see a dotted line in FIG. 4).

During the touch sensing period, the timing controller 106 may stop outputting of not just the flicker signal FLK, but also another gate timing control signal. Furthermore, during the touch sensing period the timing controller 106 may stop outputting of at least one data timing control signal for controlling an operation timing of the data driver SIC.

Figure 16:
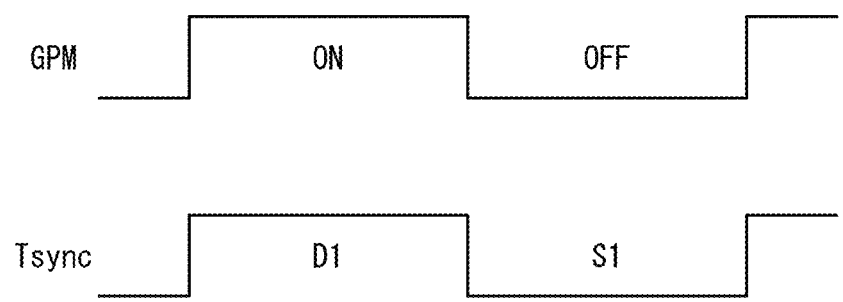
FIG. 16 is a diagram illustrating an example in which gate pulse modulation is deactivated during a display period and a touch sensing period.

Referring to FIGS. 15 and 16, the timing controller 106 does not generate a flicker signal FLK during a touch sensing period S1. As a result, the gate pulse modulator 108 does not modulate VGH of a shift clock, and thus, gate pulse modulation GPM is deactivated during the touch sensing period.

Figure 17:
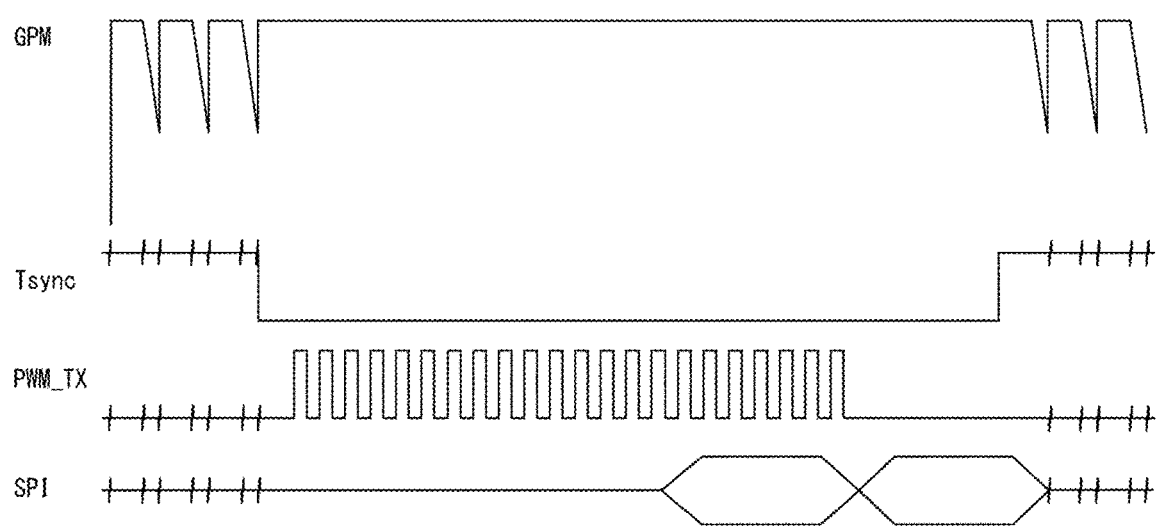
FIG. 17 is an experimental result diagram illustrating an example in which jitter of touch data is addressed in an experimental where gate pulse modulation is deactivated.

FIG. 17 is an experimental result diagram illustrating an example in which jitter of touch data is addressed in an experimental where gate pulse modulation is deactivated. In this experiment, a flicker signal FLK is not generated in every display period and every touch sensing period. In a real driving environment, it is desirable to deactivate gate pulse modulation during only a touch sensing period in order to prevent flickering in an image and a touch sensing error.

As described above, the present invention may separate power of a data driver and a touch sensor driver of an SRIC to thereby prevent malfunction of a touch sensor driver. Furthermore, the present invention may stop outputting at least one control signal for controlling a driving circuit during a period in which touch sensors are driven, so that malfunction of the touch sensor driver may be prevented more definitely.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device having touch sensors, comprising:
a display panel in which pixels and touch sensors are arranged, having data lines and gate lines intersecting with each other, and sensor lines respectively connected to the touch sensors;
an integrated circuit (IC) including a data driver for supplying a data voltage of an input image to the data lines, and a touch sensor driver for driving the touch sensors; and
a printed circuit board including a power circuit generating a DC voltage;
wherein the integrated circuit (IC) includes a first input and a second input,
wherein the printed circuit board includes a first output and a second output,
wherein a first power supply path is configured to supply the DC voltage to the touch sensor driver, and a second power supply path is configured to supply the DC voltage to the data driver,
wherein the integrated circuit is configured to supply an AC voltage to at least one of the data lines and the sensor lines during a touch sensing period,
wherein the first power supply path is electrically connected between the power circuit and the touch sensor driver through the first input of the integrated circuit (IC) and the first output of the printed circuit board, and
wherein the second power supply path is electrically connected between the power circuit and the data driver through the second input of the integrated circuit (IC) and the second output of the printed circuit board.

2. The display device of claim 1, wherein the DC voltage is used as power for a digital circuit of the data driver and for an Analog-to-Digital Converter (ADC) of the touch sensor driver.

3. The display device of claim 1, further comprising:
a gate driver configured to supply a gate pulse to the gate lines;
a gate pulse modulator configured to modulate a voltage of a gate pulse which is to be applied to the gate driver;
a timing controller configured to transmit pixel data of the input image to the data driver, and control an operation timing of the data driver and an operation timing of the gate driver; and
a touch sensor controller configured to control operation timings of the touch sensor driver.

4. The display device of claim 3,
wherein one frame period is time-divided into at least one display period and at least one touch sensing period,
wherein the pixels are driven during the display period, and
wherein the touch sensors are driven during the touch sensing period.

5. The display device of claim 4,
wherein, during the display period, the timing controller generates a control signal for controlling the gate driver, a control signal for controlling the gate pulse modulator, and a control signal for controlling the data driver,
wherein, during the touch sensing period, the timing controller stops outputting of at least one of the control signals.

6. The display device of claim 3, wherein the gate pulse modulator modulates the voltage of the gate pulse during only the display period, except for the touch sensing period.

7. A driving method of a display device having pixels and touch sensors, data lines and gate lines intersecting with each other, and sensor lines respectively connected to the touch sensors, wherein the display device comprises an Integrated Circuit (IC) which comprises a data driver for supplying a data voltage of an input image to data lines of a display panel, and a touch sensor driver for driving the touch sensors, a gate driver configured to supply a gate pulse to the gate lines; and a gate pulse modulator configured to modulate a voltage of a gate pulse which is to be applied to the gate driver; wherein one frame period is time-divided into at least one display period and at least one touch sensing period, the method comprising:
generating a DC voltage from a power circuit on a printed circuit board,
supplying the DC voltage to the touch sensor driver through a first power supply path between a first input of the integrated circuit (IC) and an output of power circuit,
supplying the DC voltage to the data driver through a second power supply path between a second input of the integrated circuit (IC) and the output of power circuit, and
supplying an AC voltage to at least one of the data lines and the sensor lines during a touch sensing period.

8. The method of claim 7, wherein the DC voltage separated from the data driver and the touch sensor driver is used as power for a digital circuit of the data driver and for an Analog-to-Digital Converter (ADC) of the touch sensor driver.

9. The method of claim 7, further comprising:
during the display period in which the pixels of the display panel are driven, modulating a gate pulse which is applied to the gate lines of the display panel; and
during the touch sensing period stopping a modulation a voltage of the gate pulse.

10. The method of claim 9, further comprising: during only the display period, except for the touch sensing period, generating a control signal for controlling modulating of the gate pulse.

11. A display device, comprising:
a display panel in which pixels and touch sensors are arranged, having data lines and gate lines intersecting with each other, and sensor lines respectively connected to the touch sensors;
an integrated circuit (IC) including a data driver for supplying a data voltage of an input image to the data lines, and a touch sensor driver for driving the touch sensors;
a gate driver configured to supply a gate pulse to the gate lines; and
a gate pulse modulator configured to modulate a voltage of the gate pulse which is to be applied to the gate driver;
wherein the pixels are driven during a display period,
wherein the touch sensors are driven during a touch sensing period,
wherein a modulation of a voltage of the gate pulse is deactivated during the touch sensing period, wherein a DC voltage from a power circuit is supplied to the touch sensor driver through a first power supply path, and to the data driver through a second power supply path, wherein the first power supply path is connected between the power circuit and the touch sensor driver, wherein the second power supply path is connected between the power circuit and the data driver, wherein the integrated circuit is configured to supply a first AC voltage to at least one of the data lines and the sensor lines during the touch sensing period, and wherein the gate driver is configured to supply a second AC voltage to the gate lines during the touch sensing period.

12. The display device of claim 1, wherein the DC voltage is used as power for a digital circuit of the data driver and for an Analog-to-Digital Converter (ADC) of the touch sensor driver.

13. The display device of claim 11, further comprising:
a timing controller configured to transmit pixel data of the input image to the data driver, and control an operation timing of the data driver and an operation timing of the gate driver; and
a touch sensor controller configured to control operation timings of the touch sensor driver,
during the display period, the timing controller generates a control signal for controlling the gate driver, a control signal for controlling the gate pulse modulator, and a control signal for controlling the data driver, and
during the touch sensing period, the timing controller stops outputting of the control signal for controlling the gate pulse modulator.

14. The display device of claim 13, wherein the gate pulse modulator modulates the voltage of the gate pulse during only the display period, except for the touch sensing period.

15. The display device of claim 1, further comprising a ground line,
wherein the ground line is disposed between a third input of the integrated circuit (IC) and a third output of the printed circuit board,
wherein a ground voltage is supplied to the integrated circuit (IC) through the ground line.

16. The display device of claim 1, wherein the pixels are driven during a display period,
wherein the touch sensors are driven during a touch sensing period,
wherein the touch sensor driver converts a touch data into a digital data during an ADC operation period of the touch sensing period,
wherein the ADC operation period of the touch sensing period overlaps with the display period.

17. The display device of claim 11, wherein a phase of the first AC voltage is the same as a phase of the second AC voltage.

* * * * *